Dec. 3, 1946. P. VAN SITTERT 2,411,914
FASTENER
Filed Nov. 17, 1943

*INVENTOR.*
PAUL VAN SITTERT
BY
ATTORNEY

Patented Dec. 3, 1946

2,411,914

UNITED STATES PATENT OFFICE 2,411,914

FASTENER

Paul Van Sittert, Shaker Heights, Ohio, assignor to The Cleveland Pneumatic Tool Company, Cleveland, Ohio, a corporation of Ohio Application November 17, 1943, Serial No. 510,636

5 Claims. (Cl. 85—5)

The present invention relates to fasteners for temporarily holding together perforated plates or sheets in superposed relation preparatory to riveting or the like.

Temporary fasteners of the herein described type have become generally known in the trade as sheet holders and are usually applied to and removed from the plates or sheets by means of specially designed pliers. These sheet holders are being widely used in the aircraft industry with a great deal of success. However, in the prior art devices, there is a tendency for certain of the parts to become broken, causing the fasteners to spring out of the sheets or pliers and thereby presenting a serious hazard to workers.

It is, therefore, an object of the present invention to provide a temporary fastener in which the parts are united in a manner to substantially preclude the possibility of injury to workers should the fastener break while in use.

Other objects and advantages more or less ancillary to the foregoing reside in the specific construction and aggroupment of the elements peculiar to this structure, as will become apparent from a more complete examination of this specification.

In the drawing which illustrates the invention:

Figure 1:
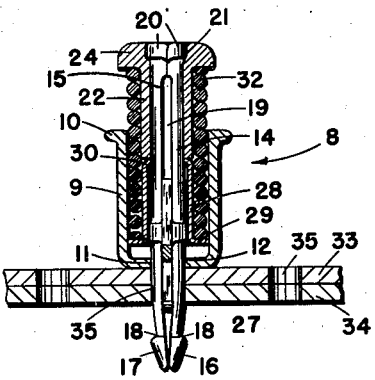
Fig. 1 is a vertical sectional view of the improved fastener with the several parts in the position they assume when initially applying the fastener to the sheets.

Referring to the drawing for a more detailed description thereof, a temporary fastener or sheet holder embodying the features of the present invention is generally designated in the several views by the reference numeral 8 and is shown to comprise a substantially cylindrical shaped housing 9 formed at its upper end with an external annular flange 10, and having its lower end formed by a cross wall or base 11 having a cylindrical central bore 12 formed therein and extending therethrough.

Slidably mounted within the housing 9 and capable of movement through the bore 12 is a retainer generally designated by the reference numeral 13, said retainer comprising a pair of legs 14 and 15, the lower ends of which are formed with enlarged pointed ends constituting feet 16 and 17, respectively, forming outwardly inclined lateral projections 18 engageable with the underside of the sheets to be clamped, as will be hereinafter more fully explained. The inner surfaces of the legs 14 and 15 throughout the major portion thereof are cut away to provide a longitudinal slot 19 therebetween when said legs are assembled in the fastener as particularly shown in Figs. 1 and 5 of the drawing. The upper end of each leg is formed with a head 20 which is received within a recess 21 formed in a sleeve 22.

The sleeve 22 has a central bore 23 of a diameter equal to the combined diameters of the unslotted portions of the legs 14 and 15. As before indicated, the sleeve 22 has its upper end formed with a recess 21 for accommodating the heads 20 of the legs 14 and 15, and also formed on the upper end of the sleeve is an annular flange 24. After assembly, the legs 14 and 15 are held within the sleeve 22 in a manner to present a substantially unitary construction with the heads 20 being substantially flush with the surface of the annular flange 24.

A spreader 25 is disposed between the legs 14 and 15 for maintaining said legs in substantially parallel relation, said spreader normally being positioned within the space 19 between the legs and formed with a portion 26 resting on the inner face of the bottom wall 11 from which depends a tail piece 27. As more particularly shown in Fig. 2 of the drawing, the spreader 25 is in the shape of a cross with the tail piece 27 extending through the central bore 12, and with a portion extending upwardly a considerable distance between legs 14 and 15.

A second sleeve 28 is positioned within the housing 9 and surrounds the legs 14 and 15, said sleeve having an annular flange 29 resting upon the portion 26 of the spreader 25 and frictionally engaging the walls of the cylinder. The other end of the sleeve 28 is formed with an inturned flange 30 having wiping contact with the legs and adapted to cooperate with external shoulders 31 formed on the legs 14 and 15 intermediate the ends thereof. The sleeve 28, and particularly the annular flange 29 thereof, is held against the spreader portion 26 by a compression spring 32 which spring has one end resting on the flange and its other end engaging the annular flange 24 of the sleeve 22. The spring 32 also functions to urge the sleeve 22 and the retainer legs 14 and 15 upwardly in a manner well known in this art.

Figure 2:
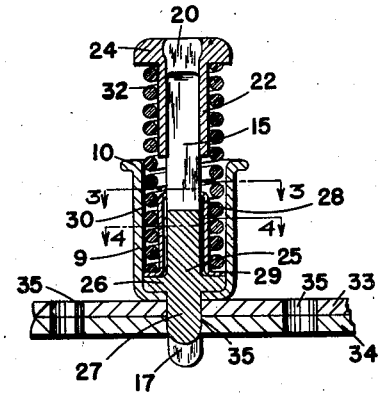
Fig. 2 is a vertical sectional view at right angles to that of Fig. 1 showing the fastener in position for clamping the sheets and illustrating parts not visible in Fig. 1.
Figure 3:
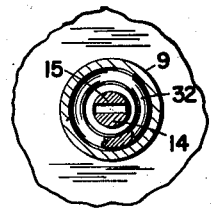
Fig. 3 is a horizontal sectional view taken substantially on line 3—3 of Fig. 2.
Figure 4:
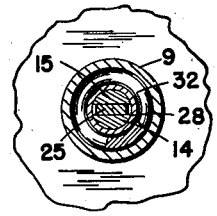
Fig. 4 is a horizontal sectional view taken substantially on line 4—4 of Fig. 2.
Figure 5:
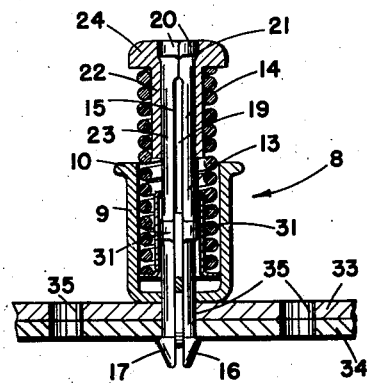
Fig. 5 is a view similar to Fig. 1 showing the fastener applied to the sheets.
Figure 6:
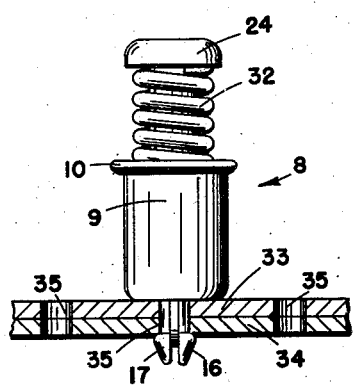
Fig. 6 is an elevational view thereof.

As is to be understood, the fastener 8 is designed to hold a pair of sheets 33 and 34 in perfect perforate alignment, the enlarged ends 16 and 17 being inserted through aligned rivet holes 35 provided through the sheets 33 and 34. The fastener 8 is ordinarily applied to and removed from the sheets by means of specially designed pliers, one jaw of the pliers being in engagement with the heads 20 or flange 24 while the other jaw is positioned beneath the annular flange 10 while partially encircling the housing 9. Upon moving the jaws of the pliers toward each other, the legs 14 and 15 are projected beyond the bottom wall 11 and also beyond the tail portion 27 of the spreader 25. The legs being formed of spring metal and biased toward each other, their projecting ends will flex toward each other for insertion through the aligned rivet holes 35, and simultaneously therewith the housing 9 is moved toward the upper face of the sheet 33 at which time the tail piece will be moved through the holes 35, as shown in Fig. 1. This movement of the pliers and several parts previously described will, of course, compress the spring 32 and upon releasing pressure on the pliers, said spring will urge the sleeve 22 and legs 14 and 15 upwardly until the feet 16 and 17 are brought into engagement with the lower face of the sheet 34. This position of the fastener is illustrated in Figs. 2 and 5 of the drawing, and it will be observed that the sheets 33 and 34 are firmly held between the bottom wall of the housing 9 and the laterally projecting portions 18 of the legs 14 and 15 through the action of the spring 32. The fastener is removed from the sheets by reversing the above procedure.

In prior art devices these fasteners have a tendency to break due to constant usage, faulty materials, or for other reasons. This breakage usually occurs on the enlarged ends of the legs, or occasionally the spreader will break, permitting the entire fastener to be released from the sheets under the action of the spring with the result that the parts would fly upwardly and outwardly, thereby presenting a serious hazard to workers. It will be seen from the present invention that the provision of the inner sleeve 28 cooperating with the annular shoulder 31 formed on the legs 14 and 15 will prevent separation of the parts even though the feet 16 and 17 should break while the fastener is in the position shown in Fig. 5. For example, should either or both of the enlarged heads snap off, the tension of the spring 32 would urge the sleeve 22 and the legs 14 and 15 upwardly and away from the sheets, but the upward movement thereof would be limited due to contact of the shoulders 31 with the inturned end 30 of the sleeve 28. The spreader 25 extends upwardly a sufficient distance to prevent the shoulders 31 from being deflected inwardly when they engage the inturned end 30 of the sleeve 28. With such contact the entire fastener will be released from the sheets, but since the spring 32 is held against full expansion, the fastener will not be released with sufficient force to cause injury to workmen standing close by.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

I claim:

1. A device for temporarily clamping together perforated sheets in superposed relation comprising a housing having a sheet engaging base provided with an opening, a retainer including a pair of legs slidable through said opening, feet on one end of said legs adapted for engagement against the underside of the sheets being clamped, a sleeve for housing the other end of said legs, a spreader for said legs having a portion resting on said base, means within said housing having engagement with said legs for limiting movement thereof in one direction relative to said housing, and spring means interposed between said sleeve and the base of said housing for drawing said retainer inwardly of said body to urge said feet into sheet clamping engagement.

2. A device for temporarily clamping together perforated sheets in superposed relation comprising a housing having a sheet engaging base provided with an opening, a retainer including a pair of legs slidable through said opening, feet on one end of said legs adapted for engagement against the underside of the sheets being clamped, a sleeve surrounding the other end of said legs, said sleeve having a central recess for housing the other end of said legs, a spreader for said legs having a portion resting on said base and a tail portion depending therefrom through said opening, a second sleeve within said housing, external shoulders on said legs within said second sleeve, an annular flange on one end of said second sleeve resting on said spreader portion, means on the other end of said second sleeve adapted to engage said shoulders for limiting movement thereof toward the open end of said housing, and spring means within said housing for drawing said legs inwardly of said body to urge said feet into sheet clamping engagement.

3. A device for temporarily clamping together perforated sheets in superposed relation comprising a housing having a sheet engaging base provided with an opening, a retainer including a pair of legs slidable through said opening, feet on one end of said legs adapted for engagement against the underside of the sheets being clamped, a shoulder formed on each leg intermediate the ends thereof, a spreader for said legs having a portion resting on said base, means within said housing adapted to engage said shoulders for limiting movement of said legs toward the open end of said housing, and spring means drawing said legs inwardly of said body to urge said feet into sheet clamping engagement.

4. A device for temporarily clamping together perforated sheets in superposed relation comprising a housing having a sheet engaging base provided with an opening, a retainer including a pair of legs slidable through said opening, feet on one end of said legs adapted for engagement against the underside of the sheets being clamped, a shoulder formed on each leg intermediate the ends thereof, a spreader for said legs having a portion resting on said base and a tail portion depending therefrom through said opening, a sleeve within said housing having an annular flange on one end thereof resting on said spreader portion, the other end of said sleeve having an inwardly turned flange adapted to engage said shoulders for limiting movement of said legs in one direction, and spring means within said housing for drawing said legs inwardly of said body to urge said feet into sheet clamping engagement.

5. A device for temporarily clamping together perforated sheets in superposed relation comprising a housing having a sheet engaging base provided with an opening, a retainer including a pair of legs slidable through said opening, feet on one end of said legs adapted for engagement against the underside of the sheets being clamped, a shoulder formed on each leg intermediate the ends thereof, a spreader for said legs, means within the housing adapted to engage said shoulders for limiting the movement of said legs toward the open end of the housing in the event of breakage, said spreader extending upwardly between said legs into the vicinity of said means, and spring means for drawing said legs inwardly of said body to urge said feet into sheet clamping engagement.

PAUL VAN SITTERT.